(12) United States Patent
Namari et al.

(10) Patent No.: US 6,820,596 B2
(45) Date of Patent: Nov. 23, 2004

(54) CONTROL SYSTEM FOR PLUNGER-TYPE FUEL PUMP

(75) Inventors: Takashi Namari, Tochigi (JP); Tomoo Shimokawa, Kawasaki (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 10/454,589

(22) Filed: Jun. 5, 2003

(65) Prior Publication Data

US 2004/0011335 A1 Jan. 22, 2004

(30) Foreign Application Priority Data

Jul. 17, 2002 (JP) ........................................ 2002-208159

(51) Int. Cl.[7] .............................................. F02M 37/08
(52) U.S. Cl. ........................ 123/501; 123/497; 123/500
(58) Field of Search ................................ 123/495, 497, 123/500, 501, 502, 357, 197.17, 179.17

(56) References Cited

U.S. PATENT DOCUMENTS

| 3,646,917 | A | * | 3/1972 | Nagy | 123/491 |
|---|---|---|---|---|---|
| 3,664,311 | A | * | 5/1972 | Endo | 123/491 |
| 4,870,939 | A | * | 10/1989 | Ishikawa et al. | 123/506 |
| 4,940,035 | A | * | 7/1990 | Waring | 123/497 |
| 5,115,783 | A | | 5/1992 | Nakamura et al. | |
| 5,505,180 | A | * | 4/1996 | Otterman et al. | 123/497 |
| 5,755,209 | A | | 5/1998 | Fischer et al. | |
| 2001/0013334 | A1 | * | 8/2001 | Tanaka et al. | 123/406.47 |

FOREIGN PATENT DOCUMENTS

| EP | 0 911 507 | 4/1999 |
|---|---|---|
| JP | 8-114179 | 5/1996 |

* cited by examiner

*Primary Examiner*—Weilun Lo
(74) *Attorney, Agent, or Firm*—Westerman, Hattori, Daniels & Adrian, LLP

(57) ABSTRACT

An internal combustion engine includes an injector that injects fuel into a cylinder. A plunger-type fuel pump pumps the fuel to the injector from a fuel tank. A control system for the fuel pump includes a unit for determining an injection start timing of the injector, and a drive unit for driving the fuel pump for a second predetermined time that starts a first predetermined time earlier than the injection start timing. This control system makes stable combustion possible even when there are pressure variations in the fuel pumped to the injector.

10 Claims, 5 Drawing Sheets

CONTROL SYSTEM FOR PLUNGER-TYPE FUEL PUMP

BACKGROUND OF THE INVENTION

1. Field of the Invention

The present invention relates to control systems for plunger-type fuel pumps of internal combustion engines.

2. Description of the Related Art

Conventionally, plunger-type fuel pumps are known that take up fuel from a fuel tank of an internal combustion engine and pump the pressurized fuel to an injector or a carburetor (see for example Japanese Patent Kokai (Laid-open publication) No. 08-114179). A typical plunger-type fuel pump includes a cylindrical plunger, a spring, a coil and an oscillation circuit. The cylindrical plunger has a piston made of a magnetic material. The piston is urged in the fuel-ejecting direction by the spring. When the coil is excited, the coil moves the piston in the direction (fuel-take-in direction) to take the fuel into the plunger. The oscillation circuit intermittently energizes the coil. When a power source voltage is supplied to the oscillation circuit, the plunger piston shifts alternately in the fuel-take-in direction and the fuel-ejecting direction, due to the intermittent energizing of the coil by the oscillation circuit and the biasing force of the spring. This reciprocating movement of the plunger piston leads to a pump operation to eject the fuel.

Some electronic fuel injection systems of internal combustion engines use such a plunger-type fuel pump. When an ignition switch is turned on, the fuel pump is driven periodically at a predetermined frequency. However, pressure variations occur in the fuel pumped to the injector due to the reciprocating motion of the plunger piston. Thus, there is a problem that even if the time for which the valve of the injector is open is held constant, the fuel injection amount varies due to the pressure variations of the fuel, so that the combustion state may become unstable.

SUMMARY OF THE INVENTION

It is thus an object of the present invention to provide a control system for a plunger-type fuel pump that makes a stable combustion possible even when there are pressure variations in the fuel that is pumped to the injector.

In accordance with one aspect of the present invention, there is provided an improved control system for a plunger-type fuel pump in an internal combustion engine. The plunger-type fuel pump pumps fuel to an injector from a fuel tank such that the injector can inject the fuel into a cylinder. The control system includes means for detecting an injection start timing of the injector, and means for driving the fuel pump for a second predetermined time that starts a first predetermined time earlier than the injection start timing.

With this control system, it is possible to achieve a stable combustion, even when there are pressure variations in the fuel that is pumped to the injector.

Other objects, aspects and advantages of the present invention will become apparent to those skilled in the art when the following detailed description and the appended claims are read and understood in conjunction with the accompanying drawings.

DETAILED DESCRIPTION OF THE INVENTION

The following is a detailed description of an embodiment of the present invention.

Figure 1:
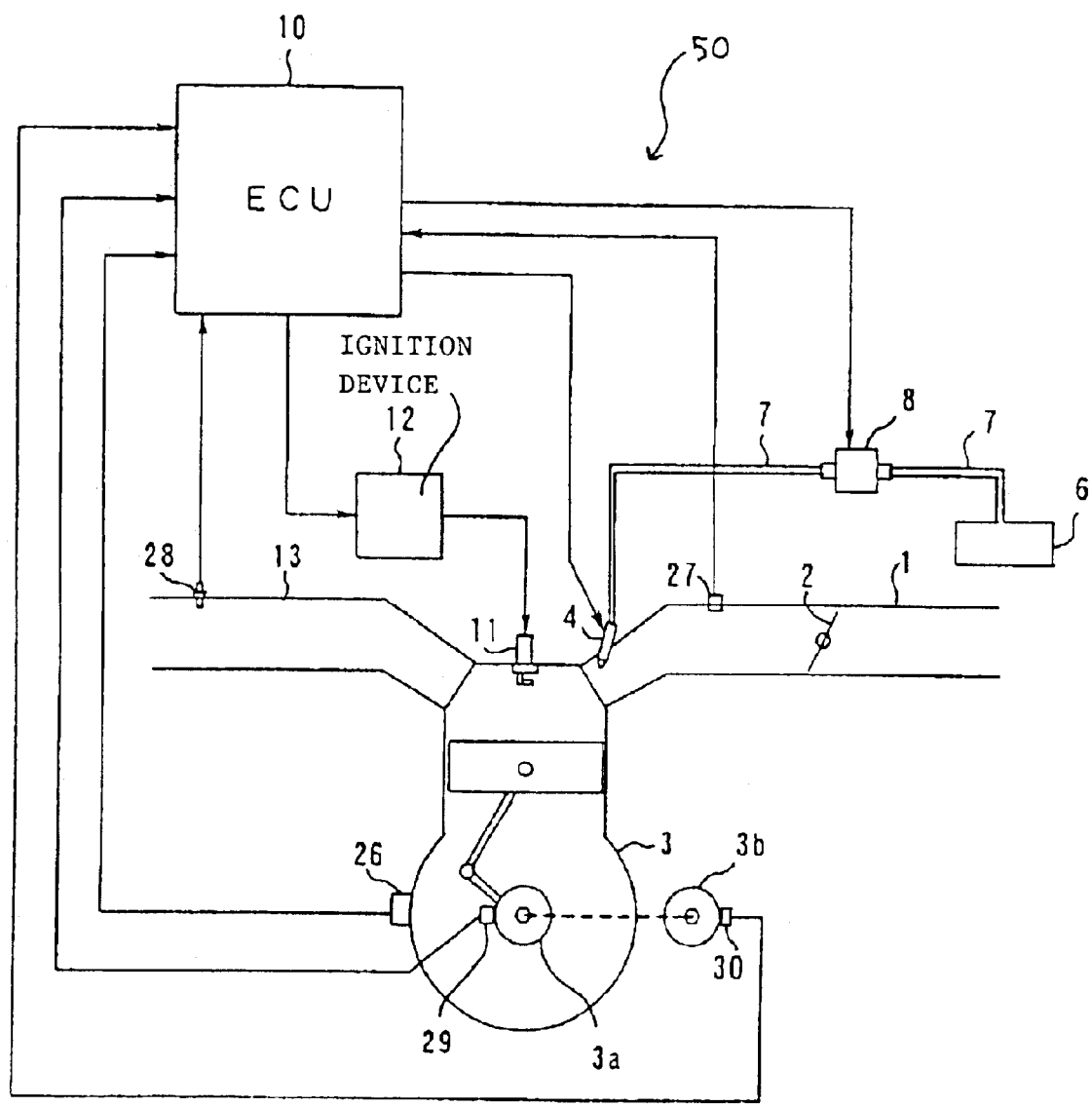
FIG. 1 is a diagrammatic view showing an engine control system to which the present invention is applied.

Referring to FIG. 1, an engine control system 50 of a 4-cycle internal combustion engine 3 for a vehicle is illustrated. The engine control system 50 employs a control system of a plunger-type fuel pump in accordance with the embodiment of the invention. It should be noted that the engine 3 has at least one cylinder with at least one fuel injector 4 and at least one intake port, and each cylinder has at least one spark plug 11, although only one cylinder, one fuel injector 4 and one spark plug are illustrated in FIG. 1 and the following description deals with the illustrated cylinder, fuel injector and spark plug only.

An inlet line 1 of this internal combustion engine 3 is provided with a throttle valve 2, and an amount of intake air that corresponds to the opening degree of the throttle valve 2 is supplied via the inlet duct 1 to the intake port of the engine 3. Near the intake port of the engine 3, the inlet duct 1 is provided with an injector 4 for fuel injection. The injector 4 is connected to a fuel supply pipe 7 from a fuel tank 6. The fuel supply pipe 7 is provided with a plunger-type fuel pump 8. This fuel pump 8 has, for example, a constitution as disclosed in Japanese Patent Kokai (Laid-open publication) No. 8-114179, the entire disclosure of which is incorporated herein by reference. The fuel pump 8 is driven by an ECU (electronic control unit) 10 such that the fuel pump 8 takes in fuel from the fuel tank 6 via the fuel supply pipe 7, and pumps the fuel via the fuel supply pipe 7 to the injector 4. The injector 4 is also driven by the ECU 10 such that the injector 4 injects the fuel towards the intake port.

The spark plug 11 is fastened to the engine 3, and this spark plug 11 is connected to an ignition device 12. By sending a spark timing command to the ignition device 12, the ECU 10 induces a spark discharge in the cylinder of the engine 3.

Figure 2:
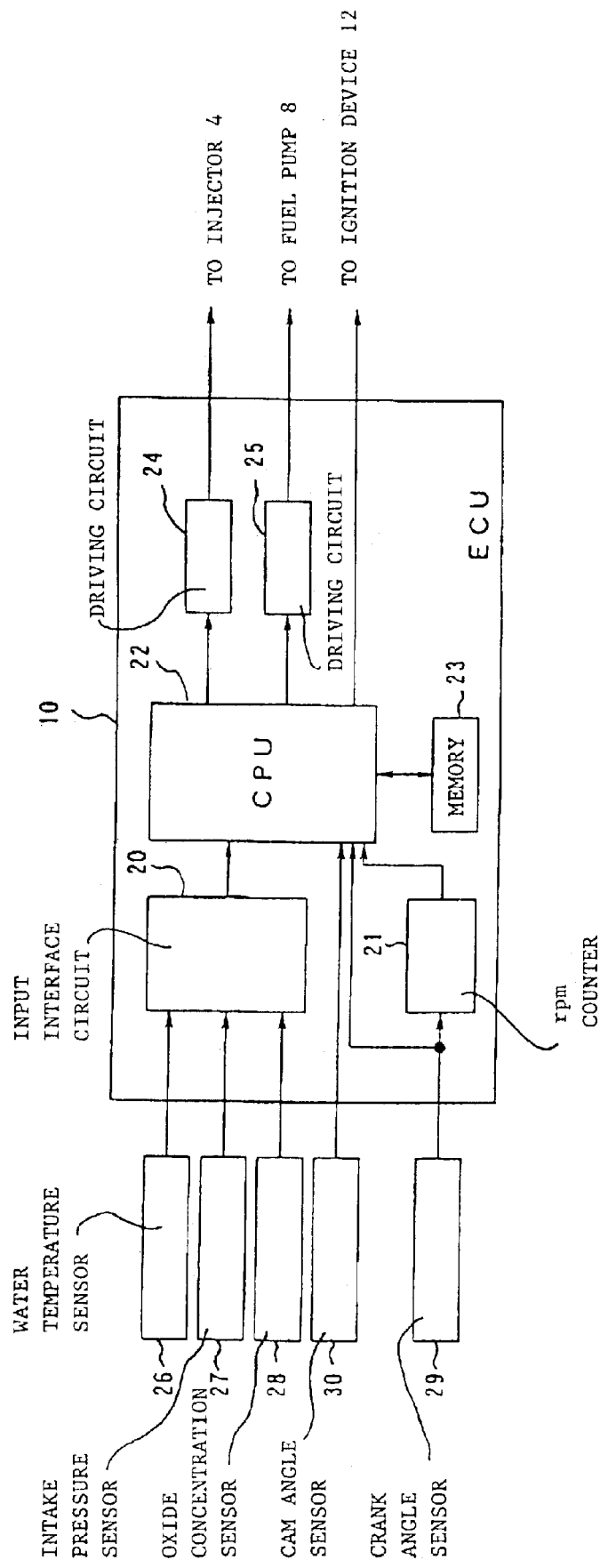
FIG. 2 is a block diagram showing the configuration of an ECU in the engine control system shown in FIG. 1.

As shown in FIG. 2, the ECU 10 includes an input interface circuit 20, an rpm counter (engine revolution speed sensor) 21, a CPU (central processing unit) 22, a memory 23, and driving circuits 24 and 25.

The input interface circuit 20 is connected to engine operation parameter sensing means, such as a water temperature sensor 26 sensing the temperature of the engine cooling water, an intake pressure sensor 27 sensing a negative pressure in the intake duct 1, and an oxide concentration sensor 28. The oxide concentration sensor 28 is provided in an exhaust duct 13 and senses the oxide concentration in the exhaust gas.

The rpm counter 21 is connected to a crank angle sensor 29 that senses the engine rpm. The crank angle sensor 29 generates a crank pulse every time a rotor (not shown) has rotated for a predetermined angle (for example 15 degrees) in cooperation with the rotation of a crank shaft 3a of the engine 3. A cam angle sensor 30 is provided in the vicinity of a cam shaft 3b. The cam angle sensor 30 outputs to the CPU 22 a TDC signal that indicates the piston in a representative cylinder (in the case of multiple-cylinder engine, the representative cylinder is a reference cylinder, and in the case of a single cylinder engine, it is that cylinder) is at the top dead center in the compression stroke of the piston. The cam angle sensor 30 also outputs a reference position signal to the CPU 22 every time the crank shaft 3a has rotated for 720 degrees.

After being reset by a crank pulse supplied from the crank angle sensor 29, the rpm counter 21 counts the clock pulses that are output from a clock generator (not shown) to generate a signal that indicates the engine rpm Ne.

Sensor information about the cooling water temperature, the negative pressure in the intake line and the oxygen concentration provided by the sensors 26 to 28 is supplied to the CPU 22 from the input interface circuit 20. Information about the engine rpm is supplied to the CPU 22 from the rpm counter 21. The TDC signal and the reference position signal are supplied to the CPU 22 from the crank angle sensor 29.

Figure 3:
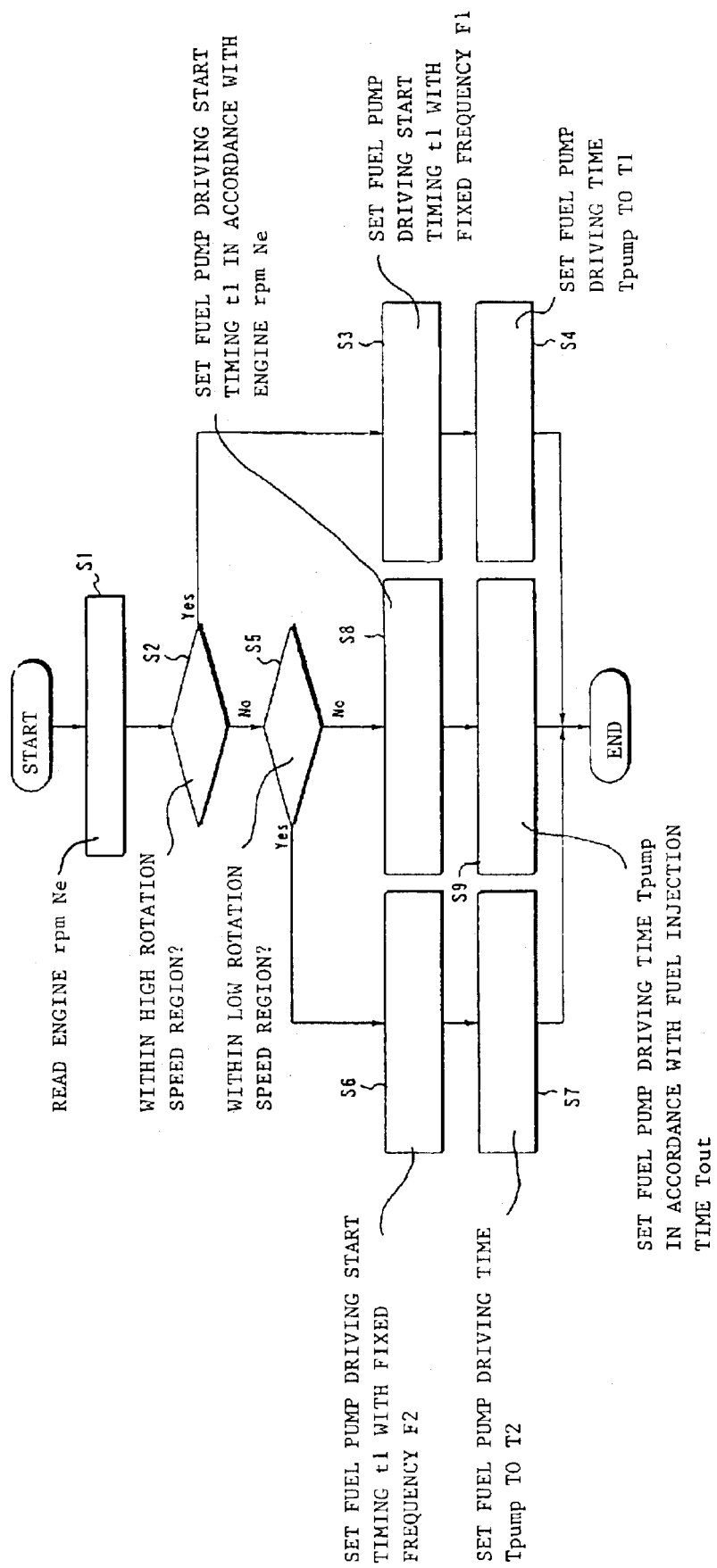
FIG. 3 is a flowchart of a routine to determine the manner of driving the fuel pump.

The CPU 22 sets the fuel pump driving start timing t1, the fuel injection start timing t2 and the ignition time in synchronization with the reference position signal. The CPU 22 also calculates the fuel injection time Tout and the fuel pump driving time Tpump. The fuel pump driving start timing t1 and the fuel pump driving time Tpump are decided by a fuel pump driving setting routine (FIG. 3; will be described). A memory 23 stores operating programs of the CPU 22 and data.

The fuel injection time Tout is in principle calculated, for example, using the following equation:

$$Tout = Ti \times K_{O2}$$

Here, Ti is the basic fuel injection time (i.e., an air/fuel ratio reference control value) that is determined by referencing a data map in the memory 23 in accordance with the engine rpm and the negative pressure in the intake line. $K_{O2}$ is an air/fuel ratio correction coefficient that is calculated in the air/fuel ratio feedback control, based on the signal provided from the oxygen concentration sensor 28.

It should be noted that usually, other corrections, such as an acceleration correction and a deceleration correction are taken into account for the calculation of the fuel injection time Tout.

Referring to FIG. 3, the fuel pump driving setting routine will be described. The CPU 22 reads in the engine rpm Ne from the value counted by the rpm counter 21 (step 1), and determines whether the engine rpm Ne is within a high rotation speed region (for example ≧8400 rpm) (step S2). If the engine rpm Ne is within the high rotation speed region, then the fuel pump driving start timing t1 is set to a time in accordance with a fixed frequency F1 (for example 70 Hz) (step S3), and the fuel pump driving time Tpump is set to a predetermined time T1 (step S4). If the engine rpm Ne is not within the high rotation speed region, then it is determined whether the engine rpm Ne is in a low rotation speed region (for example ≦600 rpm) or not (step S5). If the engine rpm Ne is within the low rotation speed region, then the fuel pump driving start timing t1 is set to a time in accordance with a fixed frequency F2 (for example 20 Hz) (step S6), and the fuel pump driving time Tpump is set to a predetermined time T2 (step S7). If the engine rpm Ne is not within the low rotation speed region, then the fuel pump driving start timing t1 is set to a certain time by looking up the data map in the memory 23 in accordance with the engine rpm Ne (step S8). The fuel pump driving time Tpump (second predetermined time) is set by looking up the data map in the memory 23 in accordance with the fuel injection time Tout (step S9).

Figure 4:
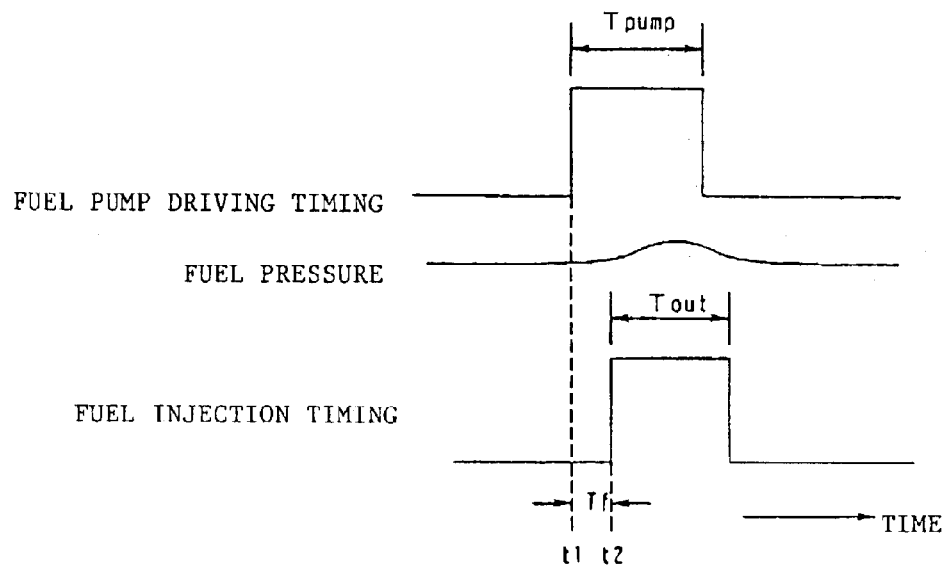
FIG. 4 is a diagram illustrating the relation between the fuel pump driving timing, fuel pressure changes and the fuel injection timing.

As shown in FIG. 4, the fuel pump driving start timing t1 of the step S8 is set to a timing that precedes the fuel injection start timing t2 by a time Tf (first predetermined time). The time Tf corresponds to the fuel pumping lag, and is determined in accordance with the engine rpm Ne. That is to say, the time Tf is set such that a rise in the fuel pressure due to the driving of the fuel pump 8 occurs during the fuel injection period (Tout), as shown in FIG. 4.

In step S8, the fuel injection start timing t2 that has been calculated in advance by the CPU 22 in a separate routine (not shown), and the time Tf that is obtained by looking up the data map are used to determine the fuel pump driving start timing t1. The timing of setting the time t1 will be described. When the fuel injection is carried out, the next fuel injection start timing t2 is calculated. Therefore, the time of deciding the fuel pump driving start timing t1 is after the calculation of the fuel injection starting timing t2 and sufficiently before the actual fuel injection starting timing t2 (that is, a time longer than a possibly maximum value of the time Tf should be reserved before the time t2).

Figure 5:
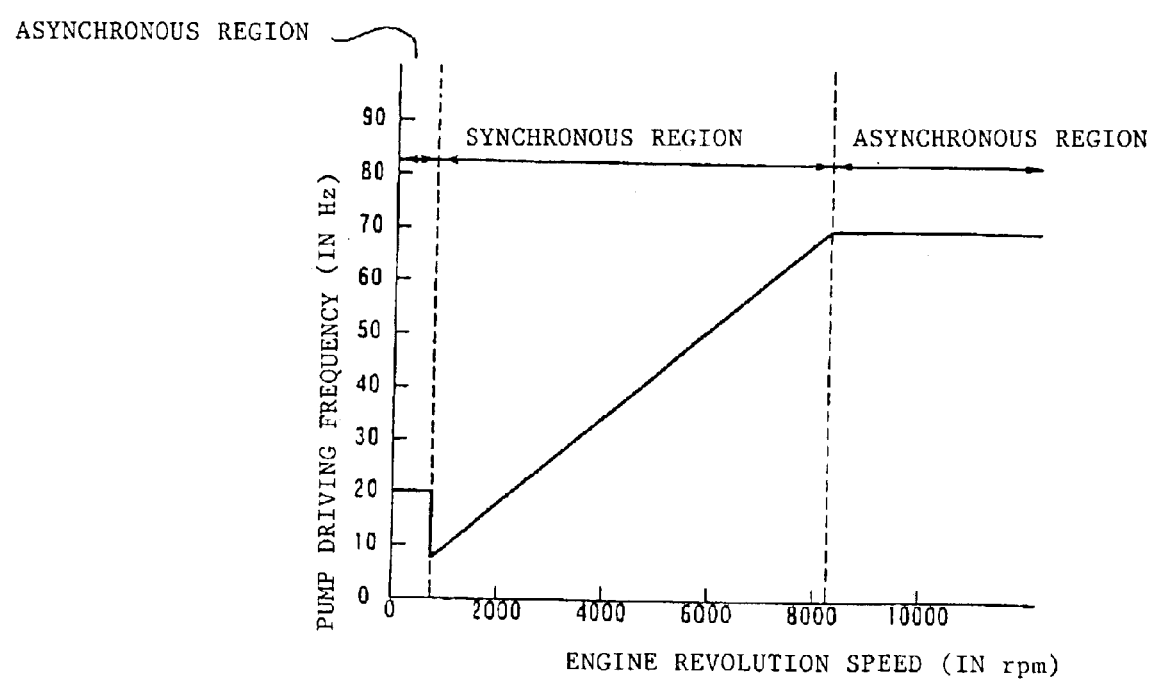
FIG. 5 is a graph showing the relation between the fuel pump driving frequency and the engine rpm.

As a result of executing this fuel pump driving setting routine, the driving frequency of the fuel pump 8 becomes an fixed frequency that is asynchronous to the engine rpm in the low rotation speed region and the high rotation speed region, as shown in FIG. 5, and apart from those regions, it becomes a frequency that is synchronous to the injection driving.

Figure 6:
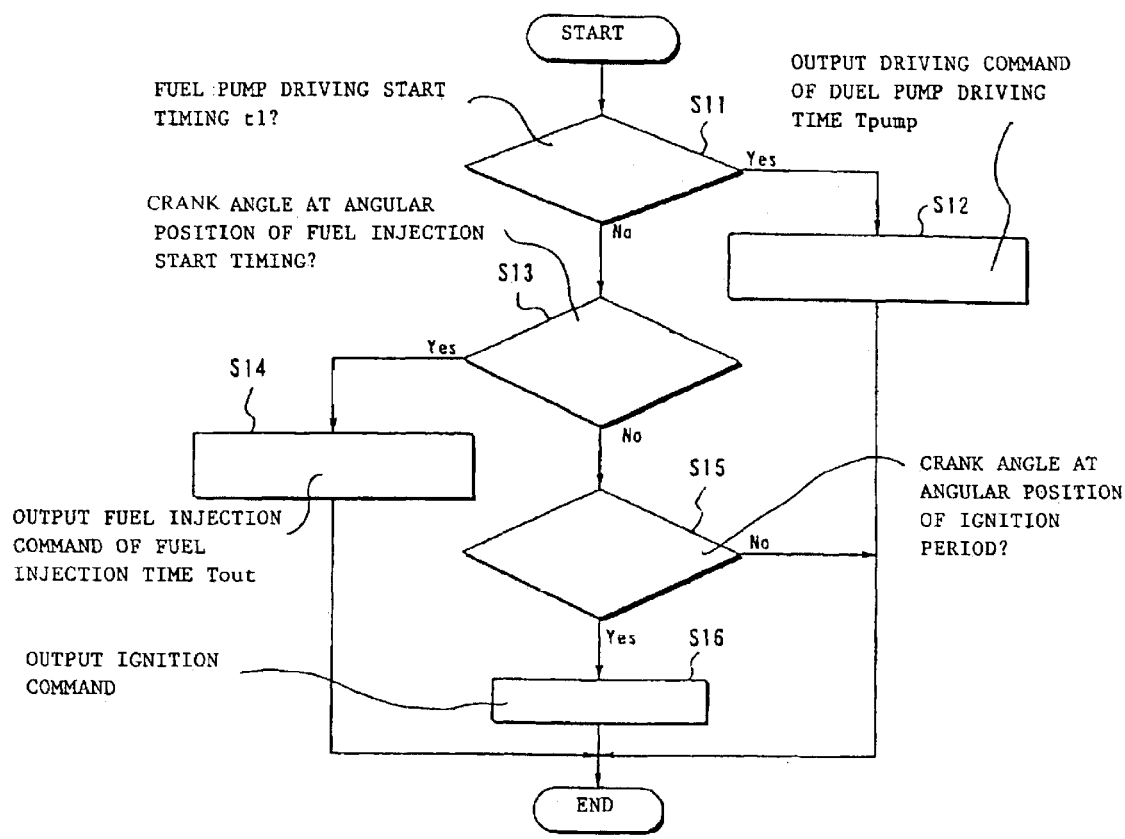
FIG. 6 illustrates a flowchart of operations performed by the ECU.

FIG. 6 is now referred to. When the CPU 22 determines, by interrupt processing for example, based on the crank pulse and the TDC signal or the reference position signal from the cam angle sensor 30, that the crank angle (which ranges from 0 degree to 720 degree) is in the angular position of the fuel pump driving start timing t1 (step S11), then the CPU 22 outputs a driving command indicating the fuel pump driving time Tpump to the driving circuit 25 (step S12). If the CPU 22 determines that the crank angle is in the angular position of the fuel injection start timing t2 (step S13), then the CPU 22 outputs a fuel injection command indicating the fuel injection time Tout to the driving circuit 24 (step S14). If the CPU 22 determines that the crank angle is in the angular position of the ignition period (step S15), then the CPU 22 outputs an ignition command to the ignition system 12 (step S16).

Consequently, in response to the driving command, the driving circuit 25 drives the fuel pump 8 for the fuel pump driving time Tpump starting at the fuel pump driving start timing t1. In this driving, a predetermined power source voltage is applied to the fuel pump 8. Starting at the fuel pump driving start timing t1, the fuel pump 8 takes up the fuel from the fuel tank 6 via the fuel supply pipe 7 and pumps the fuel through the fuel supply pipe 7 to the injector 4. The pumping with the fuel pump 8 is performed for the fuel pump driving time Tpump.

If the engine rpm Ne is outside the low rotation speed region and the high rotation speed region, then the driving circuit 24 drives the injector 4 for a fuel injection time Tout starting at the fuel injection start timing t2 in response to the fuel injection command, at a delay of the time Tf from the driving start timing t1 of the fuel pump 8. The injector 4 sprays the fuel toward the intake port of the engine 3 in the intake line 1.

Thus, if the engine rpm Ne is outside the low rotation speed region and the high rotation speed region, then a rise in the fuel pressure due to the driving of the fuel pump 8 occurs consistently (always, constantly) in the fuel injection period of the fuel injection time Tout, as shown in FIG. 4, or in other words, the fuel is consistently injected in accordance with fuel pressure variations, which used to be impossible with the plunger-type fuel pump. In the illustrated embodiment, therefore, a fuel injection of a suitable amount is performed consistently in accordance with the fuel injection time Tout, and a stable combustion state is achieved.

If the engine rpm Ne is in the low rotation speed region, such as a cranking rpm, then the fuel pump 8 is driven at a fixed frequency F2 that is greater than if the frequency were synchronized with the engine rpm Ne, so that the delay of the increase in fuel pressure when starting the engine disappears, and a sufficient fuel pressure increase can be caused. Consequently, it is possible to ensure stable combustion when starting the engine.

If the engine rpm Ne is in the high rotation speed region, then the fuel pump 8 is driven at the fixed frequency F1, so that the amount of fuel discharged from the fuel pump 8 would not saturate, thereby preventing that the fuel pressure becomes unstable.

Furthermore, by driving the fuel pump for a fuel pump driving time Tpump in synchronization with the fuel injection of injector 4, it is possible to reduce the current consumption compared to systems in which a plunger-type fuel pump is consistently driven at a fixed frequency or systems using a motor-type fuel pump.

It should be noted that in this embodiment, the injector 4 is provided in the intake line 1 and injects the fuel into the intake line 1, but the injector 4 may inject the fuel directly into the cylinder of the engine 3. If the engine 3 has a plurality of cylinders, each cylinder may have an injector or all the cylinders may share a sole injector. In either case, the teaching of the present invention can be applicable.

This application is based on a Japanese patent application No. 2002-208159, and the entire disclosure thereof is incorporated herein by reference.

What is claimed is:

1. A control system for a plunger-type fuel pump in an internal combustion engine, the fuel pump pumping fuel to an injector from a fuel tank such that the injector can inject the fuel into a cylinder, the control system comprising:
   means for determining an injection start timing of the injector; and
   driving means for driving the fuel pump for a second predetermined time that starts a first predetermined time earlier than the injection start timing,
   wherein the driving means comprises:
      means for detecting an engine rpm of the internal combustion engine;
      first setting means for setting the first predetermined time in accordance with the engine rpm; and
      second setting means for setting the second predetermined time in accordance with a fuel injection amount of the injector,
   wherein the driving means periodically drives the fuel pump at a first fixed frequency when the engine rpm is in a low rotation speed region; and
   wherein the driving means periodically drives the fuel pump at a second fixed frequency, which is higher than the first fixed frequency, when the engine rpm is in a high rotation speed region.

2. The control system according to claim 1, wherein the engine rpm is in the low rotation speed region if the engine rpm is about 600 rpm or below.

3. The control system according to claim 2, wherein the engine rpm is in the high rotation speed region if the engine rpm is about 8,400 rpm or more.

4. The control system according to claim 1, wherein the driving means drives the fuel pump at a frequency proportional to the engine rpm when the engine rpm is between the high rotation speed region and the low rotation speed region.

5. The control system according to claim 1, wherein the first fixed frequency is about 20 Hz.

6. The control system according to claim 5, wherein the second fixed frequency is about 70 Hz.

7. A method of controlling a plunger-type fuel pump in an internal combustion engine, the fuel pump pumping fuel to an injector from a fuel tank such that the injector can inject the fuel into a cylinder, the method comprising:
   determining an injection start timing of the injector; and
   driving the fuel pump for a second predetermined time that starts a first predetermined time earlier than the injection start timing;
   wherein the driving the fuel pump comprises:
      detecting an engine rpm of the internal combustion engine;
      setting the first predetermined time in accordance with the engine rpm; and
      setting the second predetermined time in accordance with a fuel injection amount of the injector, wherein the driving the fuel pump comprises periodically driving the fuel pump at a first fixed frequency when the engine rpm is in a low rotation speed region,
   wherein the driving the fuel pump comprises periodically driving the fuel pump at a second fixed frequency when the engine rpm is in a high rotation speed region, the second fixed frequency being higher than the first fixed frequency.

8. The method according to claim 7, wherein the driving the fuel pump comprises driving the fuel pump at a frequency proportional to the engine rpm when the engine rpm is between the high rotation speed region and the low rotation speed region.

9. An apparatus for controlling a plunger-type fuel pump in an internal combustion engine, the fuel pump pumping fuel to an injector from a fuel tank such that the injector can inject the fuel into a cylinder, the apparatus comprising:
   a calculation unit for determining an injection start timing of the injector; and
   a drive unit for driving the fuel pump for a second predetermined time that starts a first predetermined time earlier than the injection start timing,
   wherein the drive unit comprises:
      an engine revolution speed sensor for detecting an engine rpm of the internal combustion engine;
      a first calculator for deciding the first predetermined time in accordance with the engine rpm; and
      a second calculator for deciding the second predetermined time in accordance with a fuel injection amount of the injector,
   wherein the drive unit periodically drives the fuel pump at a first fixed frequency when the engine rpm is in a low rotation speed region,
   wherein the drive unit periodically drives the fuel pump at a second fixed frequency when the engine rpm is in a high rotation speed region, the second fixed frequency being higher than the first fixed frequency.

10. The apparatus according to claim 9, wherein the drive unit periodically drives the fuel pump at a frequency proportional to the engine rpm when the engine rpm is between the high rotation speed region and the low rotation speed region.

* * * * *